2,751,685
MOTOR DRIVEN DENTAL SCALER

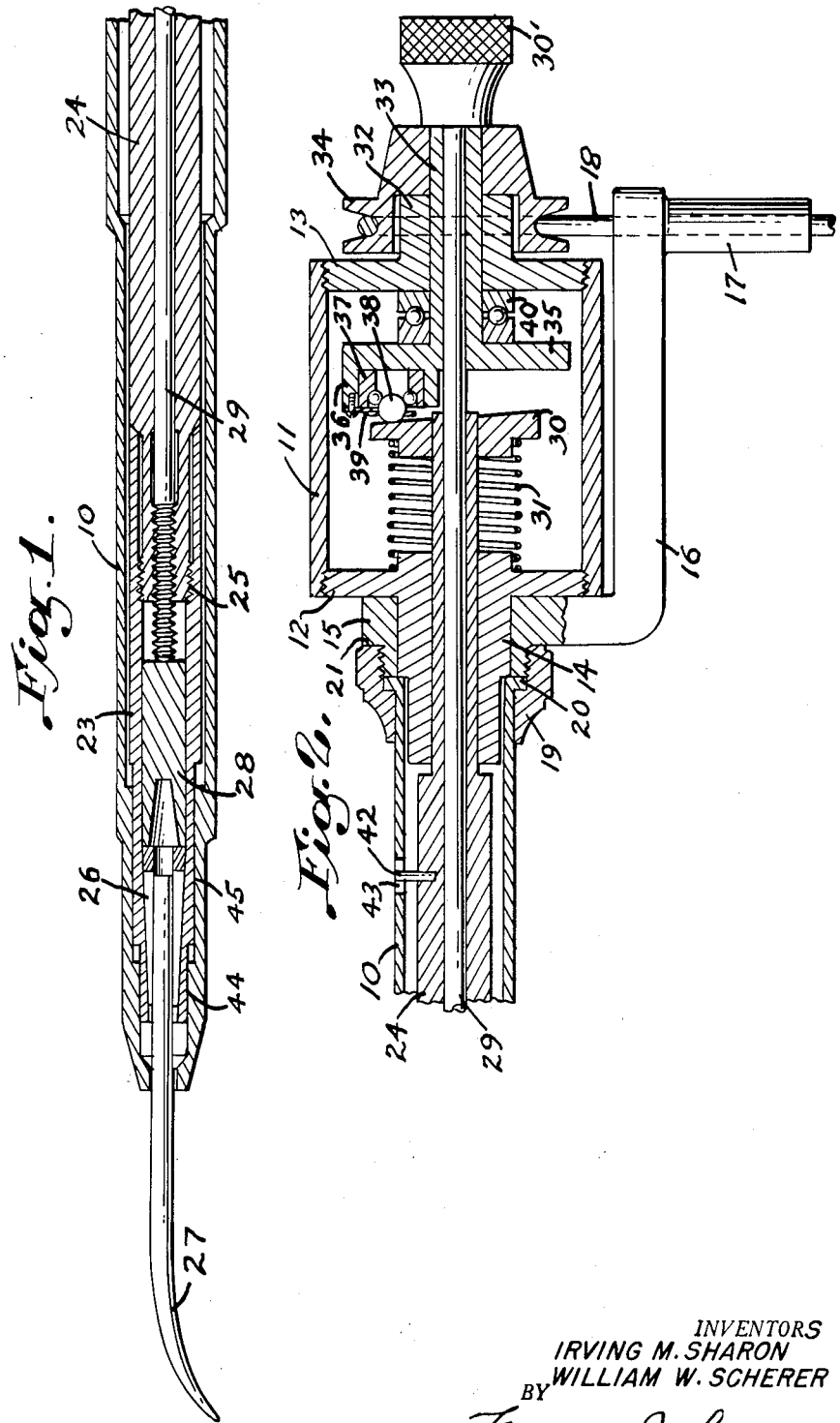

Irving M. Sharon, San Francisco, and William W. Scherer, Oakland, Calif.; said Scherer assignor to said Sharon Application November 5, 1954, Serial No. 467,066

2 Claims. (Cl. 32—50)

This invention relates to dental tools and particularly to a motor driven reciprocating hand piece adapted to hold a plurality of shapes of scaling instruments.

The removal of hard scaly deposits from human teeth is generally accomplished tediously by the scraping action of hand tools designed particularly for that purpose.

This invention has for its object the provision of a hand piece with a chuck for holding scaling tools and with power actuated means to reciprocate the chuck and tool in such a manner that it is simply necessary to apply the tool to the surface of the tooth to be scaled without the usual manual scraping action thereby obtaining a simplified more uniform and faster result.

A further object of the invention is to provide a hand piece for reciprocating a dental scaler which is similar in shape and weight to a conventional hand piece which may be mounted on and driven by conventional dental office equipment and which may be manipulated freely for use in different positions without loss of balance and convenience.

Still further objects and advantages of the invention are made apparent in the following specification wherein a preferred form of the invention is described in detail by reference to the accompanying drawing.

In the drawing:

Fig. 1 is a central longitudinal sectional view of the forward portion of a dental hand piece embodying the present invention illustrated with a scraping tool in place therein; and Fig. 2 is a similar sectional view of the rear portion of the same hand piece showing the driving mechanism thereof.

The most commonly used power supply mechanism for dental hand pieces with rotary chucks for grinding and cutting elements are motor driven. They comprise a motor, a pedal actuated rheostat and a series of pulleys and belts supported on a balanced hinged frame-work to permit manipulation.

The motor driven scaler of the present invention is made in the form of a hand piece adapted to be driven by such a power supply mechanism so that it is readily interchangeable with a conventional rotary hand piece.

In the drawing, the dental scaler of the present invention is illustrated as having the usual elongated hand piece casing shown at 10. At its rear end, the hand piece 10 is connected with a drive housing 11 which is shown as cylindrical in shape and as having a front closure plate 12 and a rear closure plate 13. A trunnion and bearing member 14 extends forwardly from the front closure plate 12 and carries the hub 15 of a support bracket 16 which has a support pin 17 secured thereto. This pin 17 is adapted to fit in the conventional socket of the usual hinged frame-work through which the drive from a motor is communicated to the hand piece through a belt as illustrated at 18. A nut 19 embraces the end of the hand piece casing 10 and a flange 20 thereon and is threaded onto the hub 15. The nut 19 is loosely fitted to turn freely with respect to the hand piece 10 and the flange 20 and abuts a shoulder 21 on the hub 15 so that the nut and the support bracket 16 are free to rotate with respect to the hand piece. Because of this connection, the hand piece may be manipulated freely without disturbing the position of the pin 17 by means of which it is connected with the driving mechanism.

The hand piece casing 10 contains an elongated two-part plunger made up of a forward portion 23 and a rear portion 24 joined by a threaded connection as illustrated at 25. The forward portion 23 of the plunger contains in its forward end a tapered collet chuck 26 received within a tapered portion of the bore in the forward end of the plunger and adapted to receive a tool such for example as the scraper illustrated at 27. The chuck 26 is a conventional split collet which, when urged forwardly into its tapered receptacle firmly grips the shank of the tool 27. The chuck is urged forwardly by a pushing member 28 slideably mounted in the bore of the plunger part 23 and acted upon by a screw 29 which is threaded in the forward end of the rear plunger portion 24 and extends rearwardly throughout the length of this plunger portion terminating in a knurled knob 30'. Consequently rotation of the knurled knob 30' in one direction tightens the chuck 26 and in the opposite direction loosens the chuck to release the tool.

Toward its rear end, the plunger part 24 is reduced in diameter and passes through the bearing 14 and it has a circular face-type cam 30 secured against rotation to its end. Interposed between the cam 30 and the inner face of the front closure plate 12 is a spring 31 disposed under compression to urge the cam 30 and plunger toward the rear. The rear closure plate 13 of the drive housing has an outwardly extending bearing member 32 supporting a hollow shaft 33. A pulley 34 is secured against rotation to the outer end of the shaft 33 for reception of the driving belt 18. On the inner end of the shaft 33, a disk 35 supports a cup 36 for an anti-friction member which bears against the face of the cam 30. This anti-friction member comprises a ball race 37 with a plurality of small ball bearings therein in the center of which is nested a ball bearing 38 for contact with the face of the cam 30. A small perforated plate 39 may be used as a retainer for the ball 38 and serves to hold all of the balls in assembled position during assembly. A thrust bearing 40 is preferably interposed between the rear surface of the disk 35 and the inner surface of the back closure plate 13.

In operation of the the device as thus far described, rotation of the sheave 34 under influence of the motor driven belt 18 drives the disk 35 causing the anti-friction bearing thereon to travel in a circular path on the face of the cam 30 imparting reciprocation to the cam and to the entire plunger assembly 23—24 to which it is connected. The spring 31 of course serves to impart the return motion usually employed by the operator for the scraping action while the action of the bearing against the face of the cam advances the plunger and tool carried thereby. In order to prevent any tendency of the cam 30 and plunger to rotate with the anti-friction bearing, the plunger is keyed against rotation with respect to the hand piece casing 10. This may be accomplished as for example by a pin 42 secured in the plunger part 24 and extending into a slot 43 in the hand piece casing 10. The rear end of the plunger is freely reciprocable in the bearing 14 and its forward end is provided with cylindrical parts having a free sliding fit with the interior of the hand piece as shown at 44 and 45.

It has been found that a suitable magnitude of reciprocating motion for most dental scaling operations is approximately 1 to 1½ millimeters though this magnitude may be varied by altering the construction of the cam 30. The force of the scraping action may also be determined by selection of a spring 31 with the desired tension and the speed of the action is varied in the usual manner by manipulation of the pedal actuated rheostat in the manner of varying the speed of the drills and cutters ordinarily used in a dental hand piece.

We claim:

1. A dental scaler which comprises a tubular hand piece, a plunger reciprocably mounted therein, a chuck for holding scaling tools in the forward end of said plunger, a face-type cam at the rear end of said plunger, drive means including a rotary member with an anti-friction member fixed thereto and bearing on said cam to impart a forward thrust thereto and resilient means for returning the plunger.

2. A dental scaler which comprises a tubular hand piece, a plunger reciprocably mounted therein with a rearwardly extending part, means to support a scaling tool at the forward end of said plunger, a drive housing at the rear end of the hand piece enclosing said rearwardly extending plunger part, a face cam on the end of said plunger part, a spring interposed between said cam and a forward portion of the housing to urge the plunger rearwardly, a rotary drive shaft extending through the rear of said housing concentric to the plunger, and an anti-friction bearing supported eccentrically with respect to the drive shaft and contacting the face of said cam to impart reciprocation to said plunger.

References Cited in the file of this patent

UNITED STATES PATENTS

| | | |
|---|---|---|
| 368,458 | Clark | Aug. 16, 1887 |
| 888,455 | Atkiss et al. | May 26, 1908 |
| 1,125,168 | Perkins | Jan. 19, 1915 |

FOREIGN PATENTS

| | | |
|---|---|---|
| 706,260 | France | Mar. 24, 1931 |